(12) United States Patent
Krude et al.

(10) Patent No.: US 8,506,440 B2
(45) Date of Patent: Aug. 13, 2013

(54) DIFFERENTIAL ASSEMBLY WITH CENTERED DIFFERENTIAL GEARS

(75) Inventors: Werner Krude, Neukirchen-Seelscheid (DE); Ralf Leuschen, Oberbettingen (DE); Michael Engelmann, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 1311 days.

(21) Appl. No.: 11/915,578

(22) PCT Filed: Mar. 3, 2006

(86) PCT No.: PCT/EP2006/001930
§ 371 (c)(1),
(2), (4) Date: Jul. 7, 2008

(87) PCT Pub. No.: WO2006/125482
PCT Pub. Date: Nov. 30, 2006

(65) Prior Publication Data
US 2008/0312024 A1    Dec. 18, 2008

(30) Foreign Application Priority Data
May 24, 2005 (DE) .......................... 10 2005 024 454

(51) Int. Cl.
*F16H 48/06* (2006.01)
(52) U.S. Cl.
USPC .......................................................... 475/230
(58) Field of Classification Search
None
See application file for complete search history.

(56) References Cited

U.S. PATENT DOCUMENTS

| | | | | |
|---|---|---|---|---|
| 2,187,843 A | | 1/1940 | Rzeppa | 475/222 |
| 3,253,483 A | * | 5/1966 | McCaw | 475/226 |
| 7,011,594 B2 | | 3/2006 | Krude et al. | |
| 7,107,871 B2 | | 9/2006 | Zaers et al. | |
| 7,582,037 B2 | * | 9/2009 | Engelmann et al. | 475/227 |

FOREIGN PATENT DOCUMENTS

| | | |
|---|---|---|
| CH | 571667 | 11/1973 |
| DE | 32 36 227 A1 | 9/1982 |
| DE | 10308800 A1 | 2/2003 |
| JP | 8170693 A | 7/1996 |
| JP | 2001271911 A | 10/2001 |
| WO | 2005/038306 | 4/2005 |

* cited by examiner

*Primary Examiner* — Erin D Bishop
(74) *Attorney, Agent, or Firm* — Rader, Fishman & Grauer, PLLC

(57) ABSTRACT

The invention relates to a differential assembly in the form of a crown gear differential, more particularly for being used in the driveline of a motor vehicle. The differential assembly comprises a differential carrier (103) which is rotatingly drivable around an axis of rotation A; two sideshaft gears (112, 113) having crown gear teeth, which are rotatably held in the differential carrier (103) on the axis of rotation A and each comprise a circumferential supporting face (125, 126); differential gears (111) with spur gear teeth, which rotate jointly with the differential carrier (103) around the axis of rotation A and which engage the teeth of the sideshaft gears (112, 113) and each comprise a circumferential contact face (127); wherein the differential gears (111) are supported by means of their contact faces (127) against the supporting faces (125, 126) of the sideshaft gears (112, 113) towards the axis or rotation A.

16 Claims, 5 Drawing Sheets

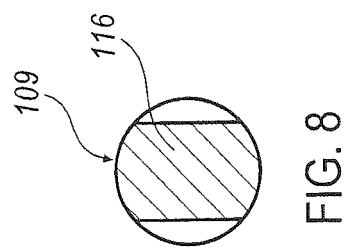

DIFFERENTIAL ASSEMBLY WITH CENTERED DIFFERENTIAL GEARS

The invention relates to a differential assembly which forms part of a differential drive and, more particularly, serves to be used in the driveline of a motor vehicle.

BACKGROUND

Differential assemblies are sufficiently known. They commonly comprise a differential carrier which is rotatingly drivable around an axis of rotation; two sideshaft gears which are rotatably held in the differential carrier and serve to transmit torque to two sideshafts; as well as a plurality of differential gears which rotate jointly with the differential carrier and whose teeth engage those of the sideshaft gears.

A distinction is made between bevel gear differentials and crown gear differentials whose design and mode of functioning correspond to one another, but which differ regarding the design of the gears. In bevel gear differentials such as they are known from DE 100 59 684 A1, DE 32 36 227 A1 or CH 571 667, both the differential gears and the sideshaft gears engaging the differential gears are provided in the form of bevel gears. The conical shape prevents the differential gears from moving radially inwardly with reference to the axis of rotation. In crown gear differentials, the sideshaft gears are provided in the form of crown gears and the differential gears engaging same are provided in the form of spur gears. As a result of this shape, the differential gears are axially displaceable along their journal axes even while they engage the sideshaft gears. In order to prevent the differential gears from moving radially inwardly with reference to the axis of rotation, different solutions have been proposed.

From DE 103 54 998 A1 there is known a differential assembly in the form of a crown gear differential which comprises three differential gears which are supported on a star-shaped supporting element consisting of a ring and three journals. In an axial view, the ring constitutes a widened journal cross-section, so that the differential gears are able to abut same.

U.S. Pat. No. 6,912,926 proposes a similar crown gear differential which comprises a central supporting element with journals for supporting the differential gears. The journals are delimited by shoulders with a greater width against which the differential gears are able to abut.

From U.S. Pat. No. 2,270,567 there is known a crown gear differential which comprises two differential gears supported on a common journal. A sleeve is slid on to the journal between the two differential gears, which sleeve prevents the differential gears from moving towards the axis of rotation.

DE 103 08 800 A1 proposes a crown gear differential whose differential gears are rotatably supported in bearing recesses of the differential carrier, so that there is no need for a bearing journal for supporting the differential gears. To prevent the differential gears from moving radially towards the axis of rotation, the differential gears comprise an upper disc-shaped abutment member which abuts the outer cylindrical face of the crown gears, as well as a lower disk-shaped abutment member which abuts a ribbing of the crown gears.

SUMMARY OF THE INVENTION

The present invention proposes a differential assembly which is lightweight, comprises a short axial length and a simple design.

In accordance with the invention, a differential assembly for use in the driveline of a motor vehicle is provided, comprising a differential carrier which is rotatingly drivable around an axis of rotation; two sideshaft gears having crown gear teeth, which sideshaft gears are rotatably held in the differential carrier on the axis of rotation and each comprise a circumferential supporting face; differential gears with spur gear teeth, which differential gears rotate jointly with the differential carrier around the axis of rotation and which engage the teeth of the sideshaft gears and each comprise a circumferential contact face; wherein the differential gears are supported by means of their contact faces against the supporting faces of the sideshaft gears towards the axis of rotation.

This differential assembly is advantageous it that it comprises a short axial length and low weight, so that the respective requirements of the automotive industry can be met. The differential gears are supported radially inwardly against the sideshaft gears, with the teeth of the spur gears engaging those of the crown gears. The differential gears are thus prevented from being displaced towards the axis of rotation. By directly supporting the differential gears against the sideshaft gears, there is achieved a simple design with few components, which has an advantageous effect on production and assembly costs. When the two sideshaft gears rotate at identical speeds, there is no relative movement between the differential gears and the sideshaft gears. When the sideshaft gears rotate at different speeds, the contact faces slide on the supporting faces, with the direction of rotation in the region of contact between the contact face and the supporting face being the same.

According to one preferred embodiment, the rotating contact face is formed by an axial projection of the respective differential gear, which projection comprises a reduced diameter relative to the spur gear teeth. The circumferential supporting face of each of the sideshaft gears is preferably formed by an axial projection of the respective sideshaft gear, which axial projection comprises a reduced diameter relative to the crown gear teeth. The axial projections of the sideshaft gears result in a particularly space-saving assembly. The axial projections of the sideshaft gears are preferably produced so as to form one piece with the hub, with the sideshaft gears having a greater axial length in the region of the hub than in the region of the crown gear teeth.

The axial projections of the differential gears and of the sideshaft gears are preferably cylindrical in shape, with the contact face being an end face and the supporting face a cylindrical face. According to an alternative embodiment, the projections of the differential gears and of the sideshaft gears can also be conical, with the contact face and the supporting face constituting conical faces. This is advantageous in that, in the region of contact between the contact face and the supporting face, there occurs a relative rolling movement, which has an advantageous effect on wear. Other alternative shapes of the contact face and of the supporting face are also conceivable; for instance, the contact faces can be spherical.

According to another preferred embodiment, there is provided a journal which comprises bearing portions for supporting the differential gears and a central portion whose axial extension is smaller with reference to the axis of rotation. The central portion is designed in such a way that the sideshafts inserted into the sideshaft gears are able to enter said central portion. This results in a particularly short axial length of the differential assembly. The central portion of the journal preferably comprises a round cross-section whose diameter is reduced relative to the bearing portions. Alternatively, the central portion of the journal can also comprise a cross-section which is non-circular to prevent rotation. This is advantageous in that the sideshafts engaging the central portion prevent the journal from rotating. The amount of wear in the bearing regions of the journal in the differential carrier and in the bearing discs respectively is thus reduced without there being any need for additional components. The anti-rotation measures are particularly effective when using exactly two differential gears on one single journal. Using only two differential gears has the additional advantage of minimizing the number of components, so that production and assembly costs are reduced. According to a first variant, the differential gears can comprise a spherical contact face for being supported against the differential carrier or a bearing disc inserted into same. According to a second variant, the differential gears can also comprise a planar contact face for being supported against the differential carrier or a bearing disc inserted into same.

According to another preferred embodiment, the differential carrier is produced in one piece, more particularly having integrally formed-on sleeve projections for supporting the differential carrier in a stationary housing; "in one piece" meaning that, for the purpose of mounting the wheels, the differential carrier cannot be dismantled into a plurality of individual parts, which is the case with differential carriers consisting of several parts. More particularly, the differential carrier can be produced as a casting. The one-piece design is advantageous in that it offers the advantage of a small number of components and a high degree of stiffness combined with advantageous production costs.

BRIEF DESCRIPTION OF THE DRAWINGS

FIG. 8 is a cross-sectional view of an exemplary embodiment of a journal for a differential assembly.

DETAILED DESCRIPTION OF THE DRAWINGS

Figure 4:
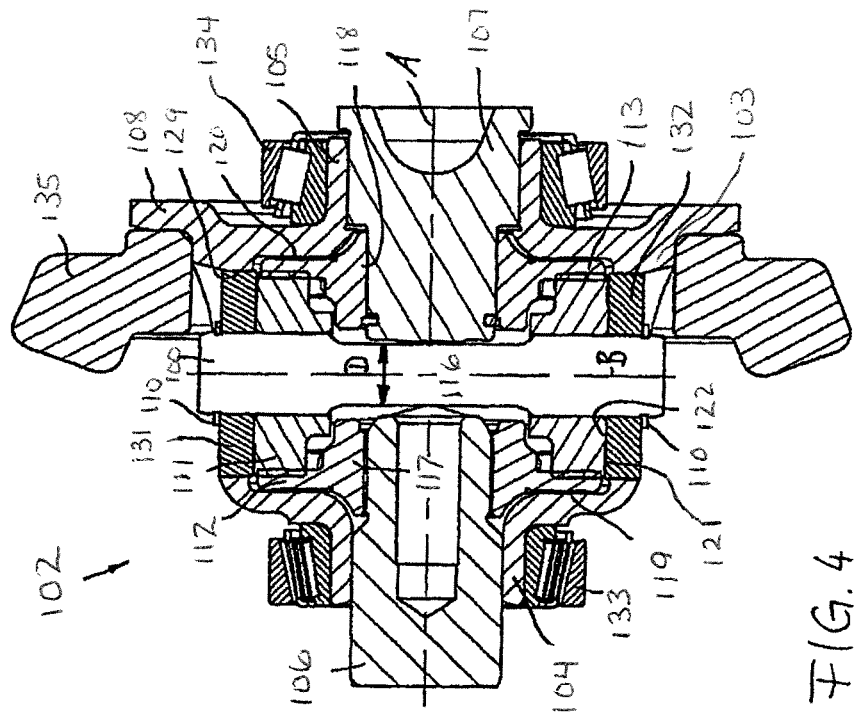
FIG. 4 is a longitudinal section through an inventive differential assembly in accordance with a second embodiment of the second invention.

The differential assembly 2 is provided in the form of a crown gear assembly, with the sideshaft gears 12, 13 being crown gears and the differential gears 11 being spur gears. This results in a compact design and a low weight. In crown gear differentials, the crown gear teeth 301 of the sideshaft gears 12, 13 are aligned radially towards the axis of rotation A and the spur gear teeth 302 of the differential gears 11 extend parallel to the journal axis B. Therefore, in principle, the differential gears 11 are able to move on the journal axes B radially inwardly or radially outwardly. When the differential assembly rotates, the differential gears 11 are accelerated radially outwardly by centrifugal forces and, by means of their contact face 21, rest against a correspondingly formed counter face 22 in the differential carrier 3.

Via a plurality of differential gears 11 which are rotatably supported on the supporting element 9 and rotate jointly with the differential carrier 3, the torque is transmitted to the sideshaft gears 12, 13 whose teeth engage those of the differential gears 11. In the present embodiment, the supporting element 9 is provided in the form of a journal which is inserted into radial through-holes in the differential carrier 3 on an axis B extending perpendicularly relative to the axis of rotation A and which is axially fixed by means of a securing ring 10. The journal 9 comprises a central portion 16 whose diameter D is reduced relative to the bearing portions on which the two differential gears 11 are supported. The sideshafts 6, 7 inserted into the sideshaft gears 12, 13 in a rotationally fast way are able to enter the central portion 16, which has a space-saving effect. It is common practice for the sideshaft gears 12, 13 to be axially supported relative to the differential carrier 3 by means of friction-reducing abutment discs 19, 20.

The differential assembly 2 is provided in the form of a crown gear assembly, with the sideshaft gears 12, 13 being crown gears and the differential gears 11 being spur gears. This results in a compact design and a low weight. In crown gear differentials, the crown gear teeth of the sideshaft gears 12, 13 are aligned radially towards the axis of rotation A and the spur gear teeth of the differential gears 11 extend parallel to the journal axis B. Therefore, in principle, the differential gears 11 are able to move on the journal axes B radially inwardly or radially outwardly. When the differential assembly rotates, the differential gears 11 are accelerated radially outwardly by centrifugal forces and, by means of their contact face 21, rest against a correspondingly formed counter face 22 in the differential carrier 3.

In order to prevent the differential gears 11, at low speeds, from moving radially inwardly towards the axis of rotation A, the sideshaft gears 12, 13 comprise axial projections 23, 24 which are directed towards the journal axis B and comprise supporting faces 25, 26 against which the differential gears 11 are able to abut by means of a contact face 27. By directly supporting the differential gears 11 against the sideshaft gears 12, 13, there is achieved a simple design with a small number of components, which has an advantageous effect on the production and assembly costs. When the two sideshaft gears 12, 13 rotate at identical speeds, i.e. when the vehicle is driven in a straight line in an unbraked condition, there is no relative movement between the differential gears 11 and the sideshaft gears 12, 13. When the sideshaft gears 12, 13 rotate at different speeds, which is the case when the vehicle negotiates a curve, the contact faces 27 slide on the supporting faces 25, 26, with the direction of rotation in the region of contact between the contact face 27 and the supporting face 25, 26 being the same in both cases. The dimensions of the axial length of the differential gears 11 and of the diameter of the sideshaft gears 12, 13 in the region of their supporting faces 25, 26 on the one hand and of the inner diameter of the differential carrier 3 on the other hand are selected to be such that, while taking into account production tolerances, there is provided a small amount of play between the differential gears 11 and the sideshaft gears 12, 13 and the differential carrier respectively. The friction forces between those components which contact one another are thus kept low.

The sideshaft gears 12, 13 are produced so as to form one piece with the hubs 17, 18 into which an associated sideshaft 6, 7 is inserted in a rotationally fixed way by means of longitudinal teeth. The hubs 17, 18 comprise a greater axial length than the crown gear teeth, which is related to the amount of torque to be transmitted, with the torque determining the length of the hubs 17, 18. The sideshafts 6, 7 inserted into the hubs 17, 18 project beyond the end face of the associated sideshaft gear 12, 13 into the recess 16 of the journal 9. The axial assembly space is thus kept small.

Below there will follow a description of the embodiments with reference to their differences. In the embodiments according to FIGS. 1 to 3, the differential gears 11 each comprise an integrally formed-on axial projection 28 with a conical lateral face and a annular end face which forms the contact face 27. The sideshaft gears 12, 13 each comprise an axial projection 23, 24 with a cylindrical superficies face which forms the supporting face 25, 26 and against which the differential gears 11 are supported with their contact faces 27. It can be seen that the contact face 21 of the differential gears 11 is spherical and comes to rest against a corresponding hollow-spherical counter face 22 in the differential carrier 3. The differential gears 11 shown in the upper and lower half of the Figures are identical, with the upper one being shown in a section through a tooth gap and the lower one in a section through a tooth. The differential gears 11 and the sideshaft gears 12, 13 are inserted into the differential carrier 3 through assembly openings contained in a different sectional plane. In the present embodiment, there is provided one single securing ring 10 for fixing the journal relative to the differential carrier 3. The journal 9 comprises a circular cross-section both in its bearing portions and in the central portion.

Figure 6:
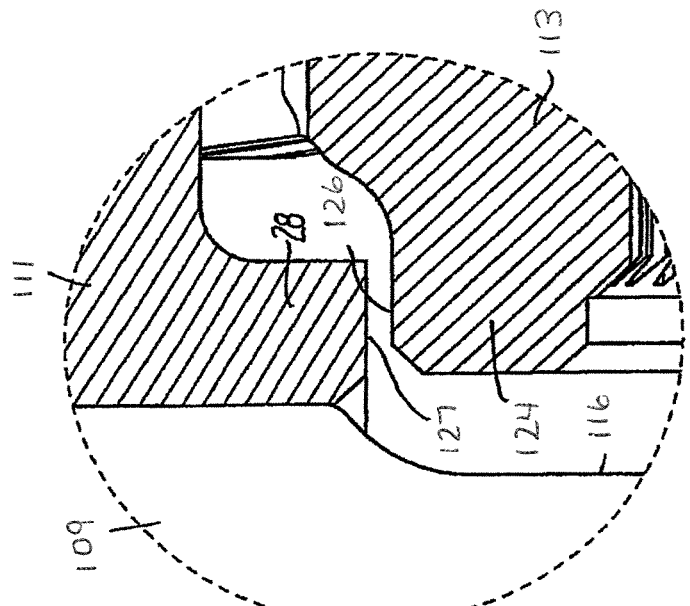
FIG. 6 shows the detail Y of FIG. 5.
Figure 5:
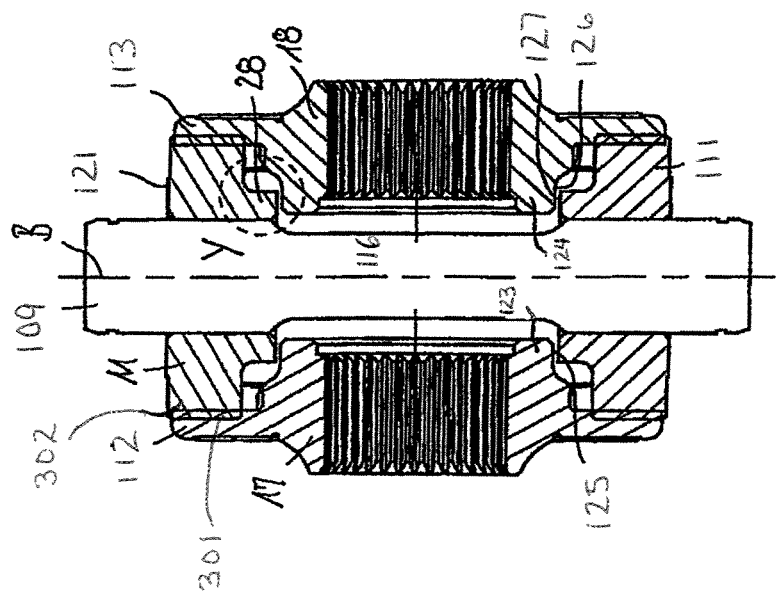
FIG. 5 is a longitudinal section through the set of differential gears of FIG. 4.

In the embodiment according to FIGS. 4 to 6, the differential gears 111 each comprise an integrally formed-on axial projection with a cylindrical superficies face and a annular end face which forms the contact face 127. The sideshaft gears 112, 113 each comprise an axial projection 123, 124 with a cylindrical circumferential face which forms the supporting face 125, 126 against which the differential gears 111 are supported by means of their contact faces 127. Between the planar end faces of the differential gears 111 and the cylindrical circumferential faces of the sideshaft gears there is provided a small amount of radial play which is shown here in an exaggerated form. It can be seen that the contact face 121 of the differential gears 111 is planar in the present embodiment and is supported against a correspondingly planar counter face 122 in the differential carrier 103. In the present embodiment, the differential gears 111 and the sideshaft gears 112, 113 are inserted into the differential carrier 3 through corresponding assembly openings 129. Subsequently, the assembly openings 129 are closed by bearing discs 131, 132 in which the journal 109 is held and against which the differential gears 111 are supported. At its two ends, the journal 109 is axially fixed by securing rings 110 relative to the bearing discs 135, 136. The cross-section of the central portion 116 of the journal 109 is non-circular, i.e. the journal 109 comprises two flattened portions which extend in opposite directions and which can be engaged by the sideshafts 106, 107 by means of their ends for anti-rotation purposes. In this way, the hardened journal 109 is prevented from rotating in the unhardened bearing discs 131, 132, which has an advantageous effect on wear. FIG. 4 also shows the rolling contact bearings 133, 134 for supporting the differential assembly 102 in a housing, and the ring gear 135 for introducing the torque.

Figure 1:
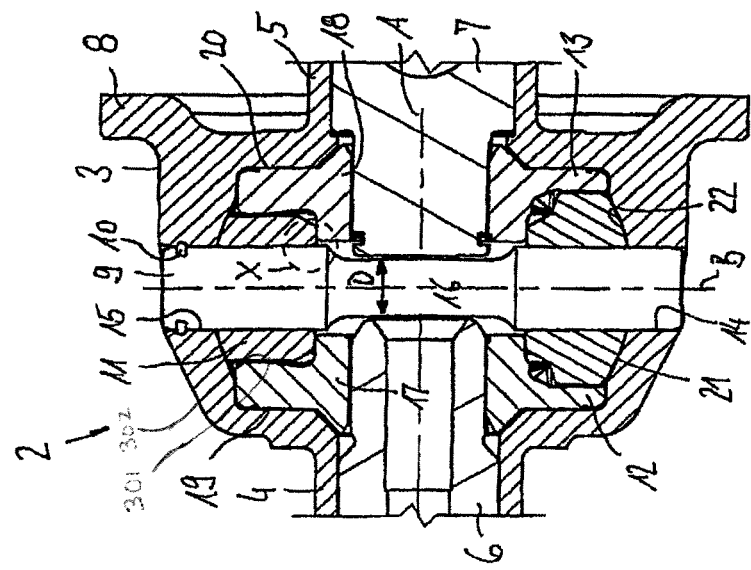
FIG. 1 is a longitudinal section through an inventive differential assembly in accordance with a first embodiment of the present invention.
Figure 3:
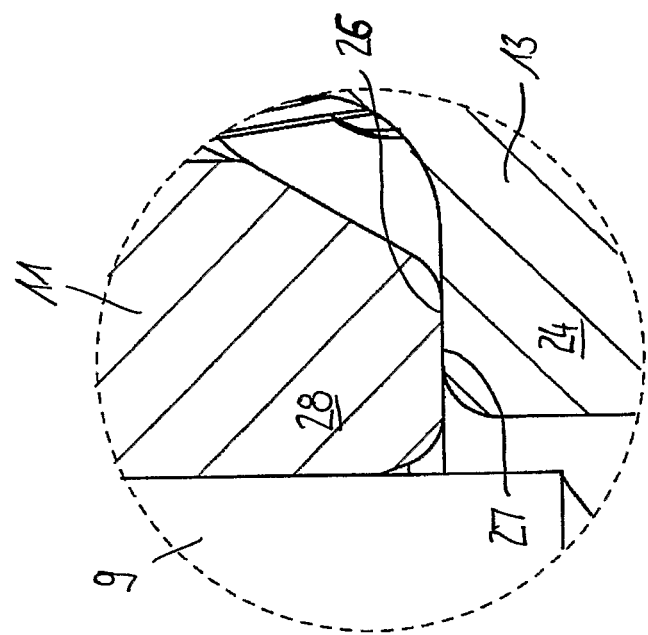
FIG. 3 shows the detail X according to FIG. 2.
Figure 2:
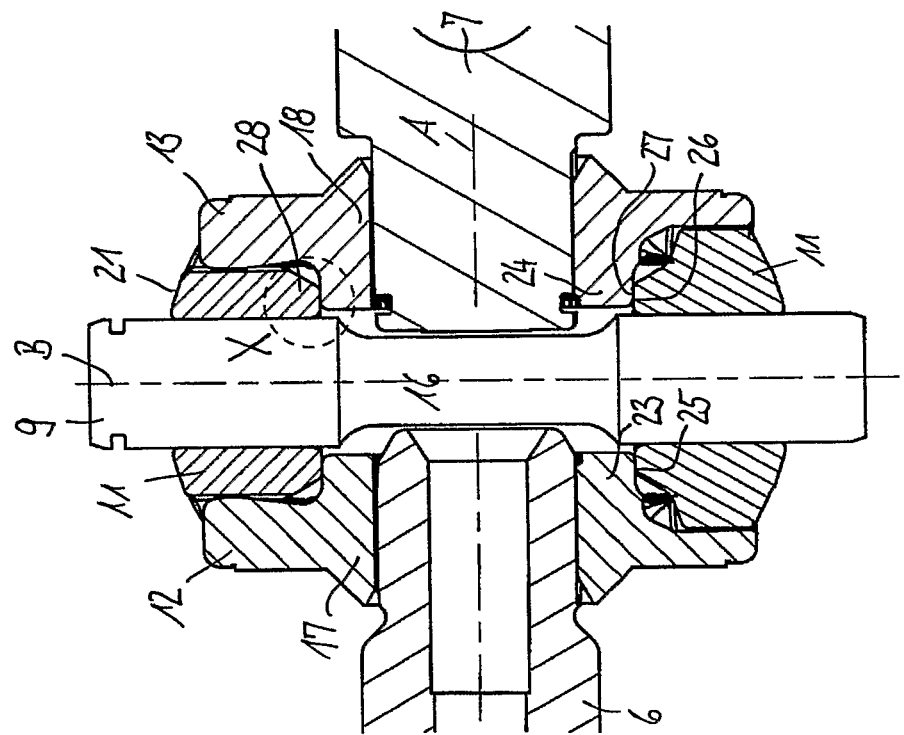
FIG. 2 is a longitudinal section through the set of differential gears according to FIG. 1.
Figure 7:
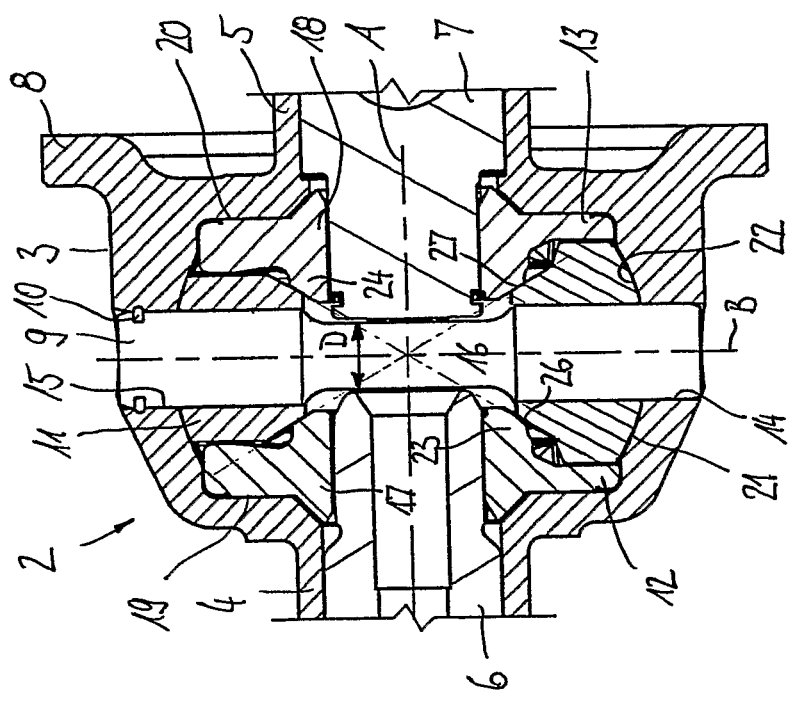
FIG. 7 is a longitudinal section through an inventive differential assembly in accordance with a third embodiment of the present invention.

The embodiment according to FIG. 7 largely corresponds to that shown in FIGS. 1 to 3. To that extent, reference is made to the above description, with identical components having been given the same reference numbers. The present embodiment is characterised in that the axial projections of the differential gears and of the sideshaft gears are conical, with the contact face and the supporting face being conical faces. This is advantageous in that in the region of contact between the contact face and the supporting face there prevails the same speed with an entirely rolling relative movement, which advantageously affects the wear conditions.

It goes without saying that the individual characteristics of the different embodiments can be exchanged relative to one another. For example, the embodiment according to FIGS. 4 to 6 can comprise conical contact and supporting faces. Equally, the embodiments according to FIGS. 1 to 3 and 7 can comprise a journal with a central portion with a non-circular cross-section, as shown, for example, in FIG. 8.

The invention claimed is:

1. A crown gear differential assembly for use in the driveline of a motor vehicle, comprising:
   a differential carrier which is rotatingly drivable around an axis of rotation (A);
   two sideshaft gears each rotatably held in said differential carrier on said axis of rotation (A), wherein each of said sideshaft gears comprises a sideshaft gear axis, crown gear teeth, and a sideshaft gear axial projection extending axially with regard to said respective sideshaft gear axis; each of said sideshaft gear axial projections comprising a conical supporting face coaxial to said respective sideshaft gear axis;
   differential gears configured to rotate jointly with said differential carrier around said axis of rotation (A) and to engage said sideshaft gears, each of said differential gears comprising a differential gear axis, differential gear teeth, and a differential gear axial projection extending axially with regard to said respective differential gear axis; each of said differential gear axial projections comprising a conical contact face coaxial to said respective differential gear axis;
   wherein each of said differential gears is supported by said respective conical contact face against said conical supporting faces of said sideshaft gears so that each of said differential gears is prevented from moving radially inwardly towards said axis of rotation (A).

2. The crown gear differential assembly according to claim 1; wherein each of said differential gear axial projections comprises a reduced diameter relative to said respective differential gear teeth.

3. The crown gear differential assembly according to claim 1; wherein each of said sideshaft gear axial projections comprises a reduced diameter relative to said respective crown gear teeth.

4. The crown gear differential assembly according to claim 1, wherein each of said sideshaft gear axial projections is produced so as to be integral with a hub of said respective sideshaft gear; wherein each of said sideshaft gears comprises a greater axial extension in a region of said respective hub than an axial extension in a region of said respective crown gear teeth.

5. The crown gear differential assembly according to claim 1; wherein each of said differential gears comprises a spherical contact face that supports said respective differential gear in said differential carrier.

6. The crown gear differential assembly according to claim 1; wherein each of said differential gears comprises a planar contact face that supports said respective differential gear in said differential carrier.

7. The crown gear differential assembly according to claim 1; wherein said differential carrier is produced so as to form one piece.

8. A crown gear differential assembly for use in a driveline of a motor vehicle, comprising:
   a differential carrier which is rotatingly driveable around an axis of rotation (A);
   two sideshaft gears each rotatably held in said differential carrier on said axis of rotation (A), wherein each of said sideshaft gears comprises a sideshaft gear axis, crown gear teeth, and a sideshaft gear axial projection extending axially with regard to said respective sideshaft gear axis; each of said sideshaft gear axial projections comprising a circumferential supporting face coaxial to said respective sideshaft gear axis;

differential gears configured to rotate jointly with said differential carrier around said axis of rotation (A) and to engage said sideshaft gears, each of said differential gears comprising a differential gear axis, differential gear teeth, and a differential gear axial projection extending axially with regard to said respective differential gear axis, each of said differential gear axial projections comprising a contact face coaxial to said respective differential gear axis; and a journal comprising:

bearing portions for supporting said differential gears, and a central portion having a reduced axial extension with regard to said axis of rotation (A); and wherein each of said differential gears is supported by said respective contact face against said circumferential supporting faces of said sideshaft gears so that each of said differential gears is prevented from moving radially inwardly towards said axis of rotation (A).

9. The crown gear differential assembly according to claim 8, wherein a respective sideshaft is inserted into each of said sideshaft gears; and each of said sideshafts enters said central portion.

10. The crown gear differential assembly according to claim 8; wherein said central portion of said journal comprises a round cross-section whose diameter is reduced relative to said bearing portions.

11. The crown gear differential assembly according to claim 8; wherein said central portion of said journal comprises a cross-section which is non-circular to prevent rotation.

12. The crown gear differential assembly according to claim 8; wherein said differential gear axial projections and said sideshaft gear axial projections are cylindrical, wherein each of said contact faces is an end face and wherein each of said circumferential supporting faces is a cylindrical face.

13. The crown gear differential assembly according to claim 8; wherein said differential gear axial projections and said sideshaft gear axial projections are conical; wherein said contact faces and said circumferential supporting faces are conical faces.

14. A crown gear differential assembly for use in the driveline of a motor vehicle, comprising:

a differential carrier which is rotatingly drivable around an axis of rotation (A);

two sideshaft gears each rotatably held in said differential carrier on said axis of rotation (A), wherein each of said sideshaft gears comprises a sideshaft gear axis, crown gear teeth, and circumferential supporting face, said each of said circumferential supporting faces being arranged coaxially relative to said respective sideshaft gear axis and axially offset relative to said respective crown gear teeth with regard to said respective sideshaft gear axis;

differential gears configured to rotate jointly with said differential carrier around said axis of rotation (A) and to engage said sideshaft gears, each of said differential gears comprising a differential gear axis, differential gear teeth, and a circumferential contact face, each of said circumferential contact faces being arranged coaxially relative to said respective differential gear axis and axially offset relative to said respective differential gear teeth with regard to said respective differential gear axis;

wherein each of said differential gears is supported by said respective circumferential contact face against said circumferential supporting faces of said sideshaft gears so that each of said differential gears is prevented from moving radially inwardly towards said axis of rotation (A).

15. The crown gear differential assembly according to claim 14; wherein each of said two sideshaft gears comprises a sideshaft gear axial projection with regard to said respective sideshaft gear axis, each of said sideshaft gear axial projections comprising said respective circumferential supporting face of said each of said sideshaft gears, each of said circumferential supporting faces being conical; and wherein each of said differential gears comprises a differential gear axial projection with regard to said, respective differential gear axis each of said differential gear axial projections comprising said respective circumferential contact face of said each of said differential gears, each of said circumferential contact faces being conical.

16. The crown gear differential assembly according to claim 14 further comprising: a journal comprising bearing portions for supporting said differential gears, and said journal comprising a central portion having a reduced axial extension with regard to said axis of rotation (A).

* * * * *